United States Patent
Beron

(10) Patent No.: US 12,409,801 B2
(45) Date of Patent: Sep. 9, 2025

(54) METHOD FOR OPERATING AN IDENTIFICATION DEVICE OF A SEAT, AS WELL AS AN IDENTIFICATION DEVICE

(71) Applicant: Mercedes-Benz Group AG, Stuttgart (DE)

(72) Inventor: Marco Beron, Gaertringen (DE)

(73) Assignee: Mercedes-Benz Group AG, Stuttgart (DE)

( * ) Notice: Subject to any disclaimer, the term of this patent is extended or adjusted under 35 U.S.C. 154(b) by 157 days.

(21) Appl. No.: 18/251,808

(22) PCT Filed: Sep. 23, 2021

(86) PCT No.: PCT/EP2021/076187
§ 371 (c)(1),
(2) Date: May 4, 2023

(87) PCT Pub. No.: WO2022/096191
PCT Pub. Date: May 12, 2022

(65) Prior Publication Data
US 2024/0017691 A1  Jan. 18, 2024

(30) Foreign Application Priority Data
Nov. 5, 2020 (DE) .................... 10 2020 006 794.8

(51) Int. Cl.
*B60N 2/00* (2006.01)
*B60R 21/015* (2006.01)

(52) U.S. Cl.
CPC ...... *B60R 21/01516* (2014.10); *B60N 2/0024* (2023.08); *B60R 21/01556* (2014.10);
(Continued)

(58) Field of Classification Search
CPC .. B60N 2/0024; B60N 2/0026; B60N 2/0032; B60N 2210/40; B60N 2210/42;
(Continued)

(56) References Cited

U.S. PATENT DOCUMENTS 6,246,936 B1   6/2001  Murphy et al.
6,397,136 B1 *  5/2002  Breed ................. B60R 21/0152
                                        701/45
(Continued)

FOREIGN PATENT DOCUMENTS

CN    101318493 A    12/2008
DE    101 52 958 A1   8/2003
(Continued)

OTHER PUBLICATIONS

Japanese-language Japanese Office Action issued in Japanese Application No. 2023-526869 dated Apr. 23, 2024, with English machine translation (10 pages).
(Continued)

*Primary Examiner* — Erick R Solis
(74) *Attorney, Agent, or Firm* — Crowell & Moring LLP

(57) ABSTRACT

A method for operating an identification device of a seat of a motor vehicle, in which an identification of a child car seat or an adult on the seat is carried out by an electronic computing device, and in which, depending on the identification, an airbag apparatus of the seat is activated, and in which a relative variance is determined from a ratio of a pressure variance of a pressure on the seat and an acceleration variance of an acceleration of the motor vehicle during a movement of the motor vehicle and, depending on the relative variance, the identification is carried out and the airbag apparatus is activated. The method further includes determining a speed variance of a speed of the motor vehicle by the electronic computing device and, depending on the
(Continued)

determined speed variance, deciding whether the identification is carried out during the movement of the motor vehicle.

9 Claims, 2 Drawing Sheets

(52) U.S. Cl.
CPC ........ *B60N 2/0032* (2023.08); *B60N 2210/30* (2023.08); *B60N 2210/40* (2023.08)

(58) Field of Classification Search
CPC ............ B60N 2210/44; B60N 2210/46; B60N 2210/48; B60N 2210/50; B60R 21/01516; B60R 21/0152; B60R 21/01522; B60R 21/01524; B60R 21/01526; B60R 21/01556; B60R 21/0156; B60R 21/01562
USPC .......................................................... 701/45
See application file for complete search history.

(56) References Cited

U.S. PATENT DOCUMENTS

| | | | |
|---|---|---|---|
| 6,542,802 B2* | 4/2003 | Gray | ................. B60R 21/01556 |
| | | | 701/45 |
| 6,850,825 B2* | 2/2005 | Murphy | ............ B60R 21/01522 |
| | | | 701/48 |
| 7,200,475 B2 | 4/2007 | Bettwieser et al. | |
| 2003/0004628 A1 | 1/2003 | Rennaker et al. | |
| 2005/0131607 A1 | 6/2005 | Breed | |
| 2005/0203687 A1* | 9/2005 | Fortune | ............. B60R 21/01556 |
| | | | 701/45 |
| 2006/0005630 A1 | 1/2006 | Jitsui et al. | |
| 2006/0100761 A1* | 5/2006 | Prieto | ............... B60R 21/01556 |
| | | | 701/45 |
| 2008/0157510 A1 | 7/2008 | Breed et al. | |
| 2015/0175111 A1 | 6/2015 | Muramatsu | |

FOREIGN PATENT DOCUMENTS

| | | |
|---|---|---|
| DE | 102 39 761 A1 | 3/2004 |
| DE | 103 40 839 A1 | 3/2004 |
| EP | 1 470 968 A1 | 10/2004 |
| JP | 2001187541 A * | 7/2001 |
| KR | 10-2011-0046612 A | 5/2011 |

OTHER PUBLICATIONS

PCT/EP2021/076187, International Search Report dated Jan. 4, 2022 (Two (2) pages).

German Search Report issued in German application No. 10 2020 006 794.8 dated May 28, 2021, with Statement of Relevancy (Seven (7) pages).

Chinese-language Office Action issued in Chinese Application No. 202180074295.5 dated May 29, 2025 (7 pages).

* cited by examiner

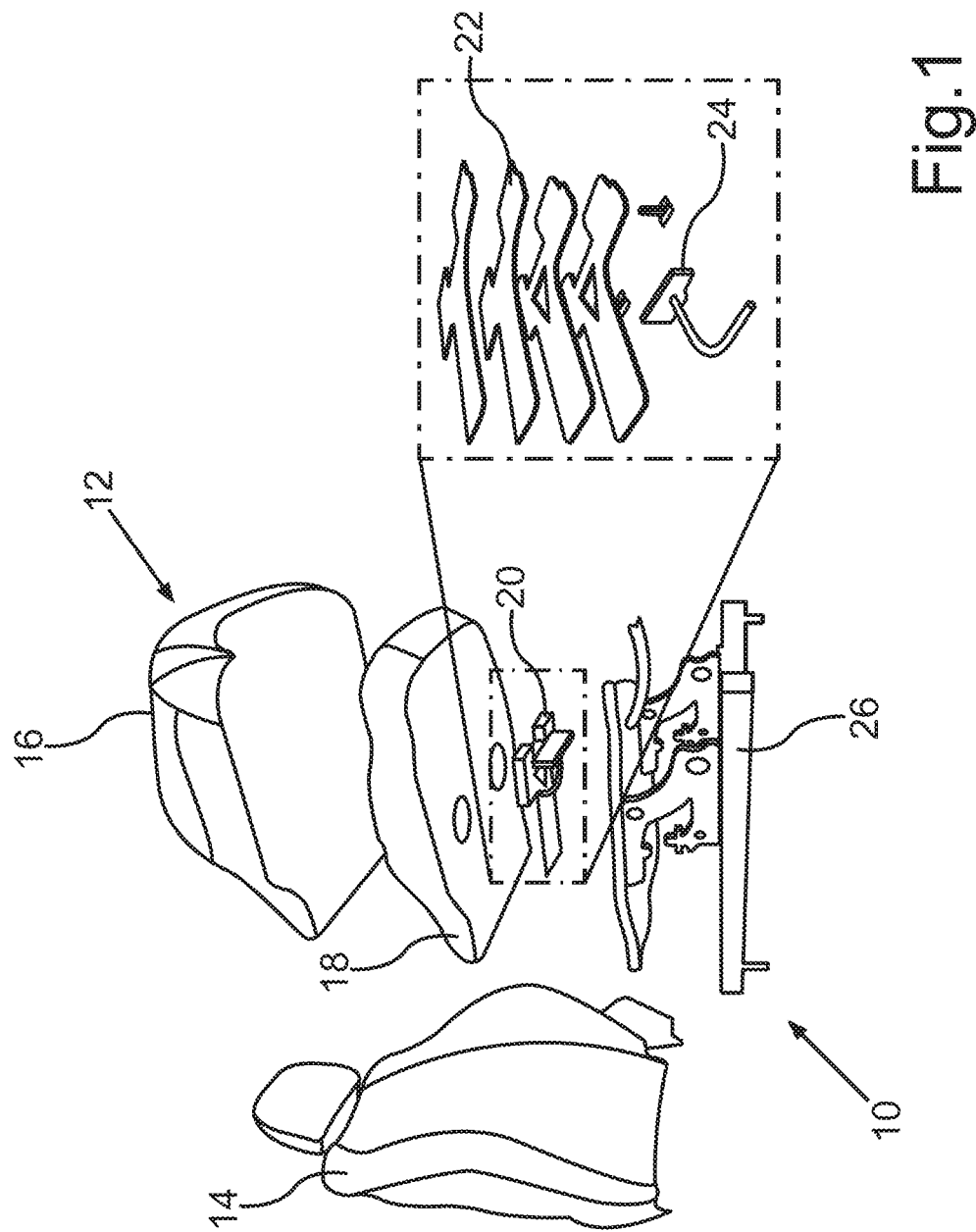

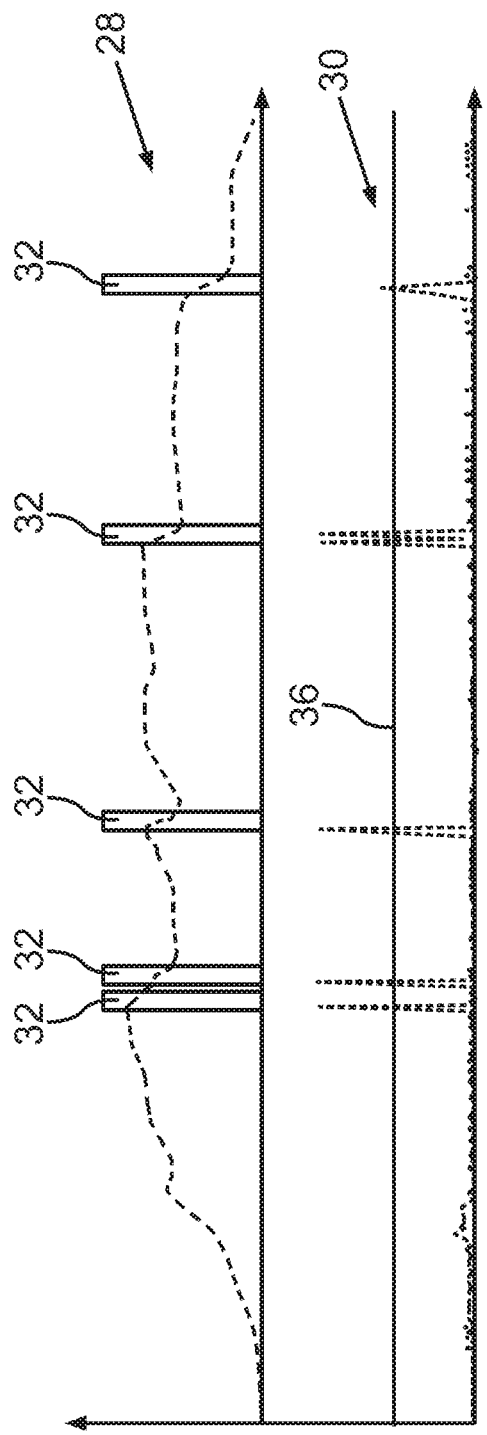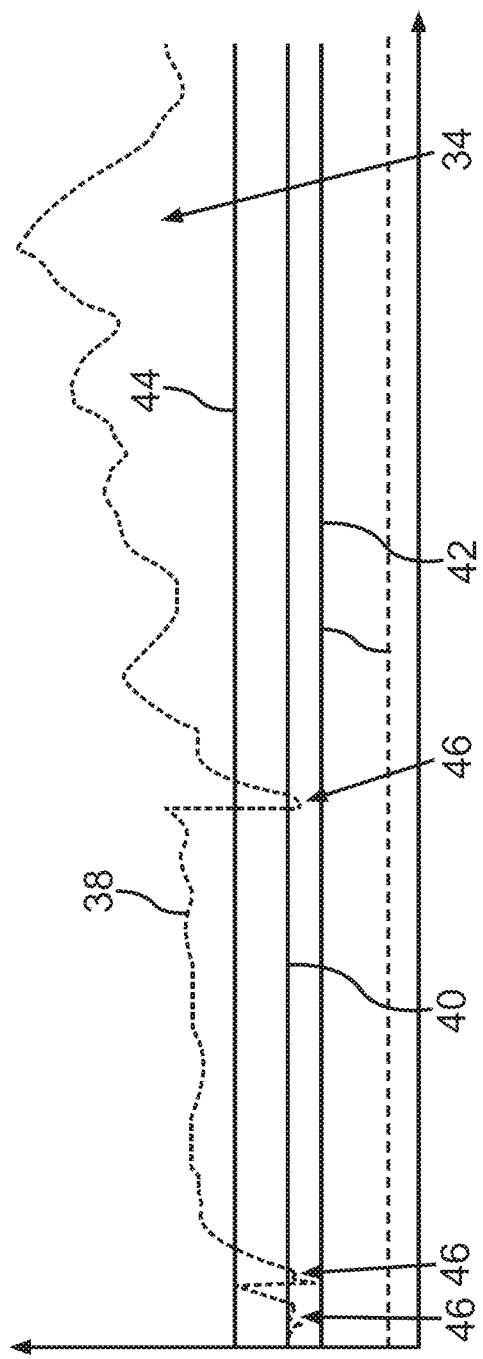

METHOD FOR OPERATING AN IDENTIFICATION DEVICE OF A SEAT, AS WELL AS AN IDENTIFICATION DEVICE

BACKGROUND AND SUMMARY OF THE INVENTION

The invention relates to a method for operating an identification device of a seat of a motor vehicle. The invention furthermore relates to an identification device.

Methods for the identification of a person on a seat are already known from the prior art. In particular, a classification of whether the person on the seat is, for example, a child in a child car seat or an adult person can hereby take place, wherein adults are in particular understood to be people who can sit on the seat without an auxiliary seat. It is furthermore known from the prior art that, for example when recognizing a child car seat on the seat, a corresponding deactivation of an airbag apparatus can be carried out. This in particular leads to increased safety for the child situated in the child car seat, since a triggering of the airbag is prevented should the child car seat be recognized. To this end, so-called static as well as dynamic methods are also known from the prior art. In the static method, a pressure is simply recorded on the seat and, depending on this, it is determined whether a child car seat is present on the seat or not. In the dynamic method, movements of the motor vehicle itself, in particular accelerations of the motor vehicle, are also taken into consideration, so that an improved recognition of a child car seat during the journey is also enabled.

US 2003004628 A1 describes a weight-based method for occupant characterization, wherein this differentiates reliably between a child and a small adult and a firmly buckled-in child car seat on the basis of a variance of the detected occupant weight and a variance of the vehicle acceleration. The weight variance and the acceleration variance are used in order to determine a relative or standardized variance, which compensates for the effects of the operation of the vehicle on a rough road surface. The occupant is characterized as a child car seat if the standardized variance is below a first threshold for a predetermined interval, and as a child or small adult if the standardized variance exceeds a second threshold for a predetermined interval.

EP 1470968 A1 comprises an occupant recognition system for vehicles comprising at least one pressure sensor arranged under the foam of a vehicle seat, at least one temperature sensor and an electronic control and/or analysis unit with which the sensors are connected. Means are provided in order to match the time response, which is in particular present when there are changes of the ambient temperature, of the output signal of the temperature sensor that is arranged at a distance from the pressure sensor or the seat foam to the time response of the temperatures prevailing in the region of the pressure sensor or of the seat foam.

It is the object of the present invention to provide a method, as well as an identification device, by means of which an improved identification or classification of people on the seat can be carried out.

One aspect of the invention relates to a method for operating an identification device of a seat of a motor vehicle, in which an identification of a child car seat on the seat or of an adult on the seat is carried out by means of an electronic computing device of the identification device, and in which, depending on the identification, an airbag apparatus of the seat is activated, and in which a relative variance is determined from a ratio of a pressure variance of a pressure on the seat and an acceleration variance of an acceleration of the motor vehicle during a movement of the motor vehicle and, depending on the relative variance, the identification is carried out and the airbag apparatus is activated.

It is provided that a speed variance of a speed of the motor vehicle is determined by means of the electronic computing device and, depending on the determined speed variance, it is decided whether an identification is carried out during the movement of the motor vehicle.

An improved identification or determination of whether this is a child car seat or an adult is thereby enabled.

In particular, the invention thus solves the problem that, for example, with a very dynamic driving manner with a mounted child car seat, the decision criterion of the dynamic algorithm, in other words the relative variance, can unintentionally increase. A very dynamic driving manner is in particular to be seen as strong acceleration and deceleration maneuvers, as well as consecutive acceleration and deceleration maneuvers. This is because the pressure variance is seen to be more strongly influenced compared to the acceleration variance, in particular in a z direction of the motor vehicle.

For the clearest possible identification of relevant situations, the analysis of the speed variance has proven to be expedient. The calculation can hereby in particular be parameterizable, for example via the number of the speed values which are used for the calculation of the variance. Furthermore, a filtering of the calculated value can be realized, for example via a rolling average. If the speed variance now exceeds a parameterizable threshold, then a corresponding reaction can occur at least for the duration of the exceeding, for example the resetting of the relative variance to an existing parameterizable starting value. Furthermore, for stabilizing a hysteresis or a similar function, an extension of the reaction by a parameterizable length of time can, for example, be implemented.

This in particular has the advantage that in relevant situations, like, for example, in strong acceleration and deceleration maneuvers, corresponding acceleration changes can be identified. A singular analysis of the absolute pedal position, as is, for example, the case in the prior art, cannot identify this change. In, for example, an identification of the pedal position, false positive situations can occur. For example in downhill journeys in which an ongoing, strong operation of the braking pedal is carried out, a corresponding situation would be recognized. Further, in uphill journeys, in which an ongoing, strong operation of the accelerator pedal is carried out, such a situation would also be recognized. Further, it is possible on the basis of the pedal position to determine false negatives. For example, in a change of acceleration below the absolute threshold value, a corresponding false negative can be recognized.

According to an advantageous embodiment, a current starting value for the relative variance is determined below a predetermined speed threshold value. In particular, this predetermined speed can, for example, be under four kilometres per hour. The relative variance is then correspondingly determined, for example by means of a so-called static algorithm, which only takes the current pressure into consideration. A starting value for the relative variance can thereby be reliably generated, wherein the relative variance is then, in turn, dynamically determined on the basis of the current starting value during the movement of the motor vehicle, whereby a corresponding identification of the person can be carried out.

It is also advantageous if an identification on the basis of the currently determined relative variance is suppressed above a predetermined threshold value for the speed variance. It is thereby enabled that, for example, false identifications can be suppressed during the relevant situations. False identifications can thus not be suppressed during the, for example, strong accelerations and changes in acceleration. An improved identification of the person can thus be realized over the entire journey.

It has further been shown to be advantageous if the starting value of the relative variance is used above the threshold value for the speed variance. In other words, should the speed variance exceed the threshold value, the starting value of the relative variance is used. It is thus reset and determined afresh. A reliable algorithm can thereby be provided for determining the person on the seat.

In a further advantageous embodiment, the speed variance is predetermined depending on a filtering of speed values and/or depending on a number of speed values. The determination of the speed variance can thus be parameterizable. The individual speed values can thereby furthermore already be pre-smoothed and can be used for the determination of the speed variance. Furthermore, a filtering of the calculated value can be realized, for example by means of a rolling average.

It is furthermore advantageous if, additionally, a steering angle variance of a steering angle is determined and it is decided depending on the determined steering angle variance whether, during the movement of the motor vehicle, an identification is carried out. It is thereby enabled that a further recognition of corresponding driving situations can be realized. The determining of the steering angle variance in particular occurs similarly to determining the speed variance.

It is also advantageous if, additionally, a control signal of an assistance system of the motor vehicle is transmitted to the identification device and it is decided depending on the transmitted control signal whether, during the movement of the motor vehicle, an identification is carried out. In particular, additional unstable/dynamic driving situations can thus be recognized. For example, a corresponding intervention can be transmitted as a control signal by an anti-lock braking system as an assistance system, wherein an identification is then suppressed in such a situation. Furthermore, specifications for a pre-safe trigger can be used to this end. Moreover, an electronic stabilization program can, as an assistance system, also transmit a corresponding intervention to the identification device as a control signal.

In a further advantageous embodiment, by means of a pressure sensor in the seat, the current pressure on the seat is recorded and, depending on the currently recorded pressure, the pressure variance is determined by means of the electronic computing device. For example, the pressure sensor can be arranged in a pressure mat of the seat. A reliable determination of the pressure variance can thereby be enabled.

It has further been shown to be advantageous that, if a child car seat is recognized, the airbag apparatus is deactivated, and if an adult is recognized, the airbag apparatus is activated. Adults are presently in particular to be seen as a person who does not need a booster seat. The adults, so to speak, can here also be young people who do not need a booster seat. In the case of a deactivation of the airbag, for example of the passenger airbag, it can, when a child car seat is recognized, thus be prevented that the airbag is triggered and can then lead to injuries of the child inside the child car seat.

A further aspect of the invention relates to an identification device of a seat of a motor vehicle for identifying a child car seat or an adult on the seat, having at least one electronic computing device, wherein the identification device is configured for carrying out a method according to the preceding aspect. The method is in particular carried out by means of the identification device.

Yet another aspect of the invention relates to a motor vehicle with an identification device according to the preceding aspect. The motor vehicle is in particular designed as a passenger car.

Further advantages, features and details of the invention arise from the following description of preferred exemplary embodiments as well as with reference to the drawings. The features and feature combinations referred to above in the description, as well as the features and feature combinations referred to below in the description of the figures and/or shown solely in the figures can be used not only in each specified combination but also in other combinations or alone without leaving the scope of the invention.

BRIEF DESCRIPTION OF THE DRAWINGS

FIG. 1 is a schematic perspective view of an embodiment of an identification device;

FIG. 2 is a schematic diagram with a recording of a speed of the motor vehicle and a recording of the associated speed variance; and FIG. 3 is a schematic diagram according to an embodiment of the method.

DETAILED DESCRIPTION OF THE DRAWINGS

In the figures, the same or functionally identical elements are provided with the same reference numerals.

FIG. 1 shows a schematic perspective view of an identification device 10 for a motor vehicle that is not shown. The identification device 10 is in particular configured for a seat 12 of the motor vehicle. The seat 12 in turn has in particular a backrest 14, upholstery 16, a foam overlay 18, as well as a pressure sensor 20. The pressure sensor 20 is, in turn, in particular formed from at least one silicone-filled mat 22. The identification device 10 further has at least one electronic computing device 24 with pressure and temperature sensors. The seat 12 further has a supporting spring system 26.

FIG. 2 shows a schematic diagram of a speed 28 of the motor vehicle and a correspondingly determined speed variance 30.

In the marked regions, relevant situations 32 are in particular to be noted, in which strong braking maneuvers are presently taking place. This is in particular represented by means of the falling of the speed curve. These relevant situations 32 are also to be seen as peaks inside the speed variance curve.

In the method for operating the identification device 10 of the seat 12 of the motor vehicle, the identification of a child car seat on the seat 12 or of an adult on the seat 12 is carried out by means of the electronic computing device 24 of the identification device 12, and, depending on the identification, an airbag apparatus of the seat 12 (not shown) is activated. A relative variance 34 (FIG. 3) is determined from a ratio of a pressure variance of a pressure on the seat 12 and an acceleration variance of an acceleration of the motor vehicle during a movement of the motor vehicle and, depending on the relative variance 34, the identification is carried out and the airbag apparatus is activated.

It is provided that the speed variance 30 of the speed 28 of the motor vehicle is determined by means of the electronic computing device 24 and, depending on the determined speed variance 30, it is decided whether an identification is carried out during the movement of the motor vehicle. FIG. 2 in particular shows that in the regions of a relevant situation 32, an identification is suppressed. In particular, it can be provided to this end that, for example, above a predetermined threshold value 36 for the speed variance 30, an identification is suppressed on the basis of the currently determined relative variance 34.

Further, it can in particular be provided that the speed variance 30 is predetermined on the basis of a filtering of speed values and/or depending on a number of speed values.

In particular, FIG. 2 thus shows a strong, simple braking. This behavior should be recognized and an identification suppressed thereafter. This is because in particular, with a very dynamic driving manner like, for example, the strong braking, the relative variance 34 can increase undesirably. The reason for this is the, relatively perceived, stronger influence of the pressure variance compared to the acceleration variance, in particular in a z direction. In particular, for the clearest possible identification of relevant situations 32, the analysis of the speed variance 30 has proven to be expedient. The determination can thereby be parameterizable, for example by means of the number of speed values, in particular of pre-smoothed speed values, which are used for the calculation of the speed variance 30. Further, a filtering of the calculated value, for example via a rolling average, can be realized. If the speed variance 30 now exceeds a parameterizable threshold, in particular the threshold value 36, then a corresponding reaction can occur at least for the duration of the exceeding, for example the resetting of the relative variance 34 to the existing, parameterizable starting value. Furthermore, for stabilizing a hysteresis or a similar function, an extension of the reaction by a parameterizable length of time can, for example, be implemented.

The method according to the invention can also be used for stabilizing when only the static algorithm is implemented. Further, a steering angle variance of a steering angle can additionally be determined and it can be decided depending on the determined steering angle variance whether, during the movement of the motor vehicle, an identification is carried out. It is thereby enabled that a further recognition of corresponding driving situations can be realized. The determining of the steering angle variance in particular occurs similarly to determining the speed variance. A control signal of an assistance system of the motor vehicle can also be transmitted to the identification device 10 and it can be decided depending on the transmitted control signal whether, during the movement of the motor vehicle, an identification is carried out. In particular, additional unstable/dynamic driving situations can thus be recognized. For example, a corresponding intervention can be transmitted as a control signal by an anti-lock braking system as an assistance system, wherein an identification is then suppressed in such a situation. Furthermore, specifications for a pre-safe trigger can be used to this end. Moreover, an electronic stabilization program can, as an assistance system, also transmit a corresponding intervention to the identification device 10 as a control signal.

FIG. 3 shows a further schematic diagram with the relative variance 34. In particular, FIG. 3 shows a filtered relative variance 38, a starting value 40 for the relative variance 34, a threshold value 42 for the relative variance 34 for recognizing a child car seat and a threshold value 44 for the relative variance 34 for the recognition of a person, in particular of an adult. It can be recognized in the present case that an adult has sat on the seat 12 when the motor vehicle is moving. The starting value 40 for the relative variance 34 is in particular determined at a speed of less than four kilometres per hour. At a speed of more than four kilometres per hour, the parameterizable starting value 40 is then output. It is here in particular shown that, should the relative variance 34 be above the threshold value 44, then the corresponding airbag apparatus is switched on. Should the relative variance 34 be below the threshold value 42, then the airbag apparatus is switched off.

The determining of the speed variance 30 in particular occurs similarly to the determination of the pressure variance and of the acceleration variance after four kilometres per hour. To this end, a corresponding variance range is necessary, for example via a filter device, as well as corresponding pre-filtering. It is now provided that, should the speed variance be above the corresponding threshold value 36, a resetting of the relative variance 34 to the starting value 40 thus occurs, which is in particular represented by the arrow 46. A safe situation can hereby be established. The output of the speed variance 30 can thereby be carried out in raw frames. For example, instead of a relative pressure, a direct output can be useful for test journeys.

Overall, the idea according to the invention thus suggests accordingly improving the person recognition and classification by means of the pressure sensor 20 in the seat 12, in that the speed variance 30 above the threshold value 36 leads to corresponding signals not being used or to this being used to rule out the current evaluation and the parameters are first restored, in order to prevent false analyses during changes in driving dynamics and to stabilize the determination algorithm. It is in particular provided as an essential feature of the method that measured values are cut off or overlooked if the speed variance 30 is above the threshold value 36. This allows for an improved and more stable analysis of the person recognition or classification in relation to the driving dynamics than is possible via only, for example, a pedal position. An analysis and a use of the speed variance 30 with the exceeding and resetting of corresponding parameters thus occurs, should the speed variance 30 be above the threshold value 36.

LIST OF REFERENCE CHARACTERS

| | |
|---|---|
| 10 | Identification device |
| 12 | Seat |
| 14 | Backrest |
| 16 | Upholstery |
| 18 | Foam overlay |
| 20 | Pressure sensor |
| 22 | Silicone-filled mat |
| 24 | Electronic computing device |
| 26 | Supporting spring system |
| 28 | Speed |
| 30 | Speed variance |
| 32 | Relevant situation |
| 34 | Relative variance |
| 36 | Threshold value |
| 38 | Filtered relative variance |
| 40 | Starting value |
| 42 | Threshold value |
| 44 | Threshold value |
| 46 | Arrow |

The invention claimed is:

1. A method for operating an identification device (10) of a seat (12) of a motor vehicle, in which an identification of a child car seat on the seat (12) or of an adult on the seat (12) is carried out by an electronic computing device (24) of the identification device (10), and in which, depending on the identification, an airbag apparatus of the seat (12) is activated, and in which a relative variance (34) is determined from a ratio of a pressure variance of a pressure on the seat (12) and an acceleration variance of an acceleration of the motor vehicle during a movement of the motor vehicle and, depending on the relative variance (34), the identification is carried out and the airbag apparatus is activated, comprising the steps of:

> determining a speed variance (30) of a speed (28) of the motor vehicle by the electronic computing device (24) and, depending on the determined speed variance (30), deciding whether the identification is carried out during the movement of the motor vehicle;
> wherein a current starting value (40) for the relative variance (34) is determined below a predetermined speed threshold value.

2. The method according to claim 1, wherein, via a pressure sensor (20) in the seat (12), a current pressure on the seat (12) is recorded and, depending on the recorded current, the pressure variance is determined by the electronic computing device (24).

3. The method according to claim 1, wherein, when a child car seat is recognized, the airbag apparatus is deactivated, and when an adult is recognized, the airbag apparatus is activated.

4. An identification device (10) of a seat (12) of a motor vehicle for identifying a child car seat or an adult on the seat (12), comprising:

> an electronic computing device (24);
> wherein the identification device (10) is configured to perform the method according to claim 1.

5. A method for operating an identification device (10) of a seat (12) of a motor vehicle, in which an identification of a child car seat on the seat (12) or of an adult on the seat (12) is carried out by an electronic computing device (24) of the identification device (10), and in which, depending on the identification, an airbag apparatus of the seat (12) is activated, and in which a relative variance (34) is determined from a ratio of a pressure variance of a pressure on the seat (12) and an acceleration variance of an acceleration of the motor vehicle during a movement of the motor vehicle and, depending on the relative variance (34), the identification is carried out and the airbag apparatus is activated, comprising the steps of:

> determining a speed variance (30) of a speed (28) of the motor vehicle by the electronic computing device (24) and, depending on the determined speed variance (30), deciding whether the identification is carried out during the movement of the motor vehicle;
> wherein an identification on a basis of a currently determined relative variance (34) is suppressed above a predetermined threshold value (36) for the speed variance (30).

6. The method according to claim 5, wherein the current starting value (40) is used above the predetermined threshold value (36).

7. A method for operating an identification device (10) of a seat (12) of a motor vehicle, in which an identification of a child car seat on the seat (12) or of an adult on the seat (12) is carried out by an electronic computing device (24) of the identification device (10), and in which, depending on the identification, an airbag apparatus of the seat (12) is activated, and in which a relative variance (34) is determined from a ratio of a pressure variance of a pressure on the seat (12) and an acceleration variance of an acceleration of the motor vehicle during a movement of the motor vehicle and, depending on the relative variance (34), the identification is carried out and the airbag apparatus is activated, comprising the steps of:

> determining a speed variance (30) of a speed (28) of the motor vehicle by the electronic computing device (24) and, depending on the determined speed variance (30), deciding whether the identification is carried out during the movement of the motor vehicle;
> wherein the speed variance (30) is predetermined depending on a filtering of speed values and/or depending on a number of speed values.

8. A method for operating an identification device (10) of a seat (12) of a motor vehicle, in which an identification of a child car seat on the seat (12) or of an adult on the seat (12) is carried out by an electronic computing device (24) of the identification device (10), and in which, depending on the identification, an airbag apparatus of the seat (12) is activated, and in which a relative variance (34) is determined from a ratio of a pressure variance of a pressure on the seat (12) and an acceleration variance of an acceleration of the motor vehicle during a movement of the motor vehicle and, depending on the relative variance (34), the identification is carried out and the airbag apparatus is activated, comprising the steps of:

> determining a speed variance (30) of a speed (28) of the motor vehicle by the electronic computing device (24) and, depending on the determined speed variance (30), deciding whether the identification is carried out during the movement of the motor vehicle; and
> determining a steering angle variance of a steering angle and, depending on the determined steering angle variance, deciding whether an identification is carried out during the movement of the motor vehicle.

9. A method for operating an identification device (10) of a seat (12) of a motor vehicle, in which an identification of a child car seat on the seat (12) or of an adult on the seat (12) is carried out by an electronic computing device (24) of the identification device (10), and in which, depending on the identification, an airbag apparatus of the seat (12) is activated, and in which a relative variance (34) is determined from a ratio of a pressure variance of a pressure on the seat (12) and an acceleration variance of an acceleration of the motor vehicle during a movement of the motor vehicle and, depending on the relative variance (34), the identification is carried out and the airbag apparatus is activated, comprising the steps of:

> determining a speed variance (30) of a speed (28) of the motor vehicle by the electronic computing device (24) and, depending on the determined speed variance (30), deciding whether the identification is carried out during the movement of the motor vehicle; and
> transmitting a control signal of an assistance system of the motor vehicle to the identification device (10) and, depending on the transmitted control signal, deciding whether an identification is carried out during the movement of the motor vehicle.

\* \* \* \* \*